(12) United States Patent
Shenhav et al.

(10) Patent No.: US 8,325,187 B2
(45) Date of Patent: Dec. 4, 2012

(54) METHOD AND DEVICE FOR REAL TIME 3D NAVIGATION IN PANORAMIC IMAGES AND CYLINDRICAL SPACES

(75) Inventors: Tom Shenhav, Tel Aviv (IL); Alex Cohn, Rosh Ha'ain (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 622 days.

(21) Appl. No.: 12/603,862

(22) Filed: Oct. 22, 2009

(65) Prior Publication Data
US 2011/0096089 A1   Apr. 28, 2011

(51) Int. Cl.
*G06T 15/10* (2006.01)

(52) U.S. Cl. .................................. 345/427; 345/629
(58) Field of Classification Search .................. None
See application file for complete search history.

(56) References Cited

U.S. PATENT DOCUMENTS

| | | | |
|---|---|---|---|
| 5,850,352 A * | 12/1998 | Moezzi et al. | 345/419 |
| 6,028,584 A * | 2/2000 | Chiang et al. | 345/628 |
| 6,144,501 A | 11/2000 | Nalwa | |
| 6,556,185 B2 * | 4/2003 | Rekimoto | 345/157 |
| 6,798,429 B2 * | 9/2004 | Bradski | 345/156 |
| 2003/0167466 A1 | 9/2003 | Nakamura et al. | |
| 2004/0239687 A1 * | 12/2004 | Idesawa et al. | 345/623 |
| 2006/0033999 A1 | 2/2006 | Liu et al. | |
| 2006/0227138 A1 * | 10/2006 | Oizumi | 345/428 |
| 2008/0231610 A1 * | 9/2008 | Hotelling et al. | 345/173 |
| 2008/0309668 A1 * | 12/2008 | Borovikov | 345/427 |
| 2009/0238378 A1 * | 9/2009 | Kikinis et al. | 381/92 |
| 2009/0273674 A1 * | 11/2009 | Russ et al. | 348/148 |
| 2009/0325607 A1 * | 12/2009 | Conway et al. | 455/456.3 |
| 2010/0031186 A1 * | 2/2010 | Tseng et al. | 715/786 |
| 2010/0123737 A1 * | 5/2010 | Williamson et al. | 345/672 |

FOREIGN PATENT DOCUMENTS

| | | | |
|---|---|---|---|
| JP | 2003132348 | | 5/2003 |
| JP | 2003132348 A | * | 5/2003 |
| JP | 2003-038774 | | 9/2004 |
| KR | 2004-0098194 | | 6/2006 |
| WO | 9847291 | | 10/1998 |

OTHER PUBLICATIONS

"Panoramic vision: sensors, theory, and applications, by Ryad Benosman, Sing Bing Kang, Olivier Faugeras. Contributor Olivier Faugeras, Springer, 2001, ISBN 0387951113, 9780387951119".
European search report, mailed on Dec. 17, 2010 (6 pages).

* cited by examiner

*Primary Examiner* — James A Thompson
*Assistant Examiner* — David H Chu
(74) *Attorney, Agent, or Firm* — Roach Brown McCarthy & Gruber, P.C.; Kevin D. McCarthy

(57) ABSTRACT

A method for navigating through a panoramic image in a handheld device comprises rendering a preview of a panoramic image on a cylindrical screen (cylinder), viewed from outside, as bird's eye view, providing 3 degrees of freedom.

21 Claims, 6 Drawing Sheets

METHOD AND DEVICE FOR REAL TIME 3D NAVIGATION IN PANORAMIC IMAGES AND CYLINDRICAL SPACES

FIELD OF THE INVENTION

The present invention relates to the field of handheld devices and their use to display images. More particularly, the invention relates to a method for navigating through a panoramic image in a handheld device, and to devices that implement the method.

BACKGROUND OF THE INVENTION

Panoramic photographs are wide images, with field of view greater than that of a human eye. They model the world around an observer as being projected on a cylindrical screen. These images are not designed to be viewed as whole in one glance, but rather as if through a window of limited width. Special software is required to render a view of the panoramic image, to unwarp it, using reverse cylinder transform. An immersive user experience can not be achieved with a single static view, as the panorama must be live, smoothly responding to change of the view direction.

Conventional methods do not resolve the problem of preview of a panoramic image, to allow the end-user decide if he wants to get immersed into specific panorama. With hard copy (print) there is a workaround—that is, to display the warped image as a whole. However, such approach is acceptable on large screen, but is not relevant for small screens, such as used in mobile devices, because for a wide panorama only a small portion of the screen can be used. This problem can be appreciated by comparing FIGS. 1 and 2. These and other background topics are discussed, for instance, in *Panoramic vision: sensors, theory, and applications*, by Ryad Benosman, Sing Bing Kang, Olivier Faugeras. Contributor Olivier Faugeras, Springer, 2001, ISBN 0387951113, 9780387951119.

SUMMARY OF THE INVENTION

A method for navigating through a panoramic image in a handheld device, comprises rendering a preview of a panoramic image on a cylindrical screen (cylinder), viewed from outside, as bird's eye view, providing 3 degrees of freedom, including elate to panning angle, ascent, and distance from the center of the cylinder.

According to one embodiment of the invention the user is capable of adjusting the panning angle and the ascent to find better perspective. In another embodiment of the invention the cylinder can rotate from 0° to 360° and the panning angle is not limited.

In one embodiment of the invention an immersion view of the cylinder from inside is provided, from its center. In another embodiment of the invention the discontinuous switching between bird's eye view and the view from inside is caused to look smooth and natural, by:

a) defining a "distance" coordinate;
b) preserving the panning angle, so that the part of the image in the center of the screen does not move, the field of view grows wider with distance and the sizes of objects grow smaller; and
c) choosing the switch point so that the field of view is almost the same for bird's view and immersion view.

In one specific embodiment of the invention, for bird's eye view, the cylinder is defined as a set of identical ellipse rings of 1 pixel height, and the pixel of the original panoramic image that corresponds to each pixel of the ring is found, thereby allowing to perform the projection calculations on a mobile device in real time to allow smooth rendering of the changing scene in response to user interaction via touch screen, keyboard, and accelerometer.

In another particular embodiment of the invention the whole width of the panoramic image is mapped to an arc of a circle, the radius of which is proportional to the "distance" dimension. In a further embodiment, the reverse cylinder projection is approximated by iterative fixed-point calculation.

The invention is further directed to a handheld device, typically but not solely a cellular phone, comprising software suitable to operate the method of the invention.

DETAILED DESCRIPTION OF THE INVENTION

Figure 1:
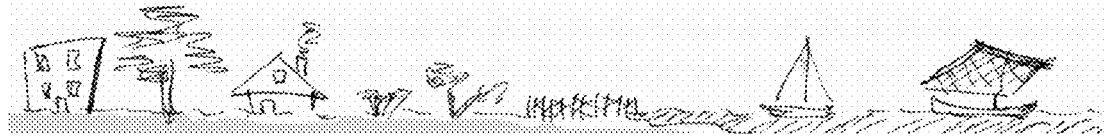
FIG. 1 shows a panoramic sketch used to illustrate the invention.
Figure 2:
FIG. 2 is a view of a small part of the panoramic image of FIG. 1.
Figure 3:
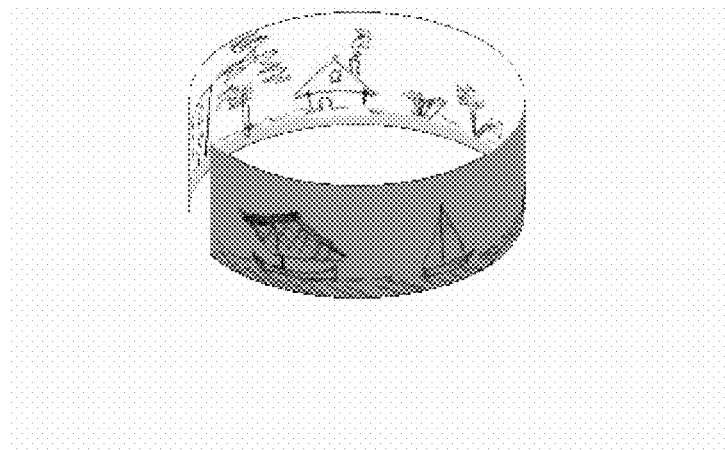
FIG. 3 is a preview of a panoramic image.
Figure 4:
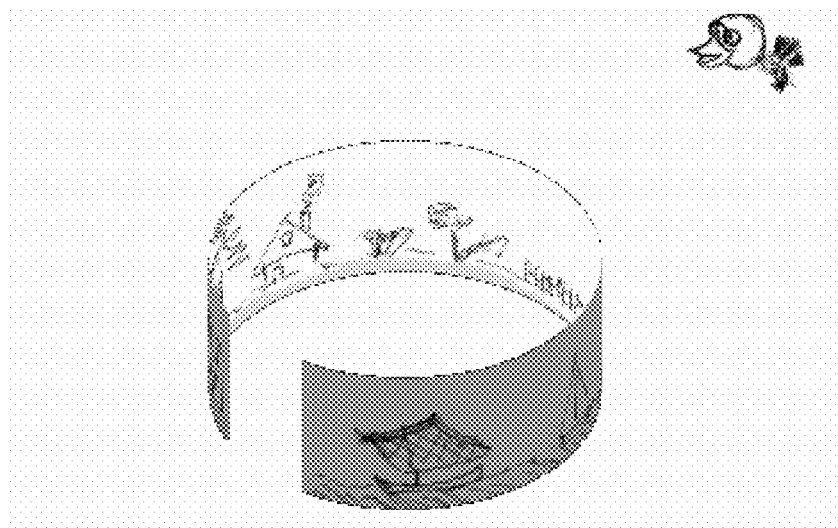
FIG. 4 shows a bird's eye view at the cylinder on which the image is disposed, from outside.
Figure 5:
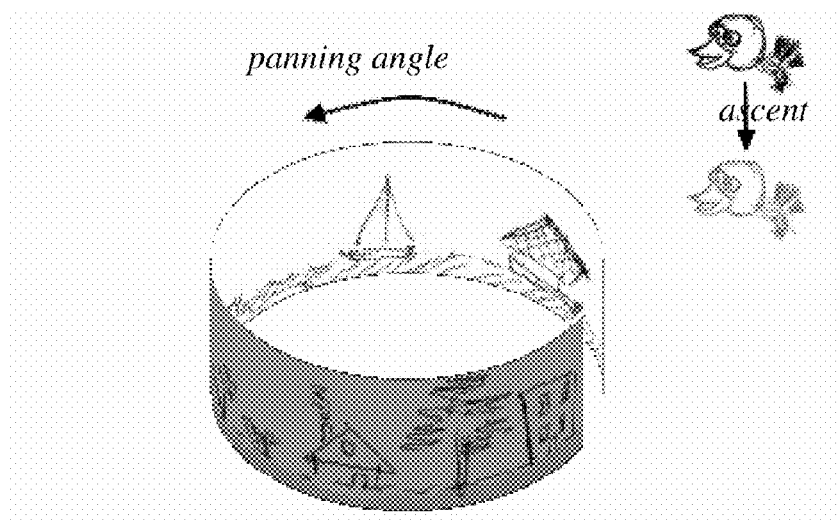
FIG. 5 illustrates the adjustment of panning angle and ascent.

According to a method of the invention the preview of a panoramic image is rendered on a cylindrical "screen", viewed from outside, as "bird's eye view", illustrated by FIG. 3, which provides 3 degrees of freedom: panning angle, ascent, and distance from the center of the cylinder, as further illustrated by FIGS. 4 and 5. These degrees of freedom permits to provide an image that is "live", as will be more apparent from the description to follow. The creation of 3-D images using a cylinder is known in the art, e.g. from Japanese patent application number 2003-038774 and from Korean patent application number 2004-0098194, and therefore is not discussed in detail hereinafter, for the sake of brevity.

Figure 6:
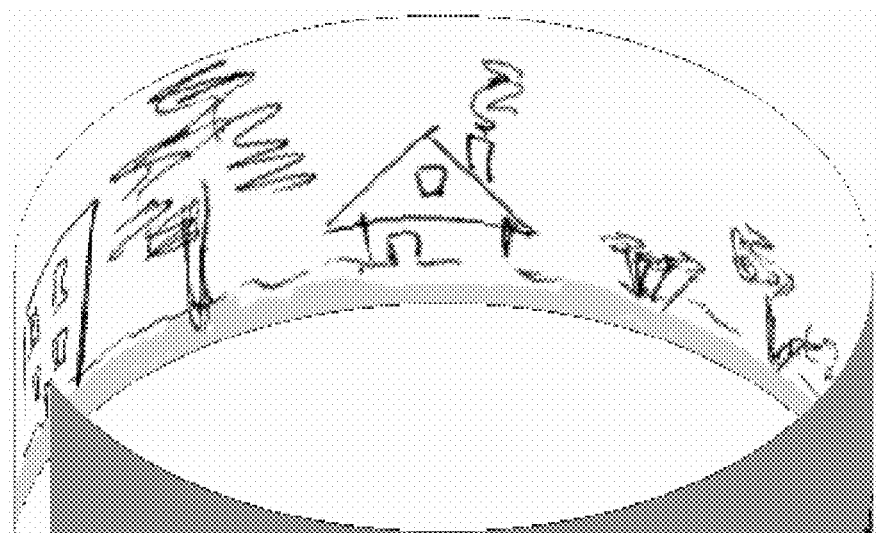
FIG. 6 is a bird's eye view from the highest ascent.
Figure 7:
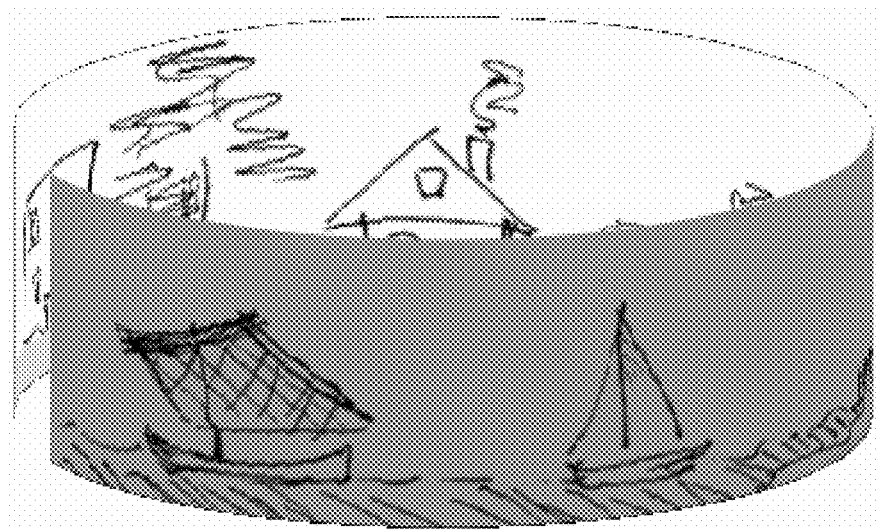
FIG. 7 is a bird's eye view from the lowest ascent.
Figure 8:
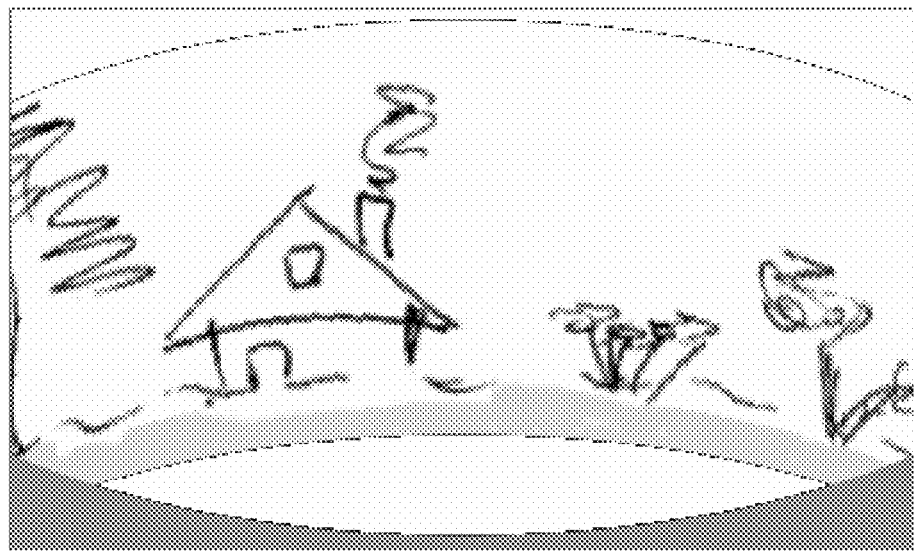
FIG. 8 is a detailed preview with reduced field of view.
Figure 9:
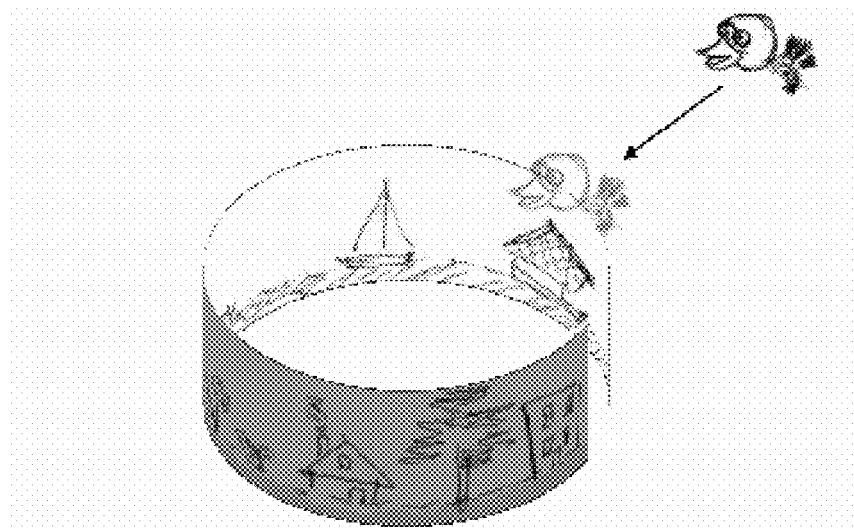
FIG. 9 illustrates the geometric model of changing the distance. For closer look, ascent is more limited.

According to the invention, the end user can adjust the panning angle and the ascent to find better perspective. The panning angle is not limited—the cylinder can handle any rotation from 0° to 360°. The effect of adjusting the ascent is illustrated in FIGS. 6 and 7. The ascent is limited by the height of the cylinder, and the distance from the cylinder. The user can also close-up to see more detail, as seen in FIGS. 8 and 9.

Figure 10:
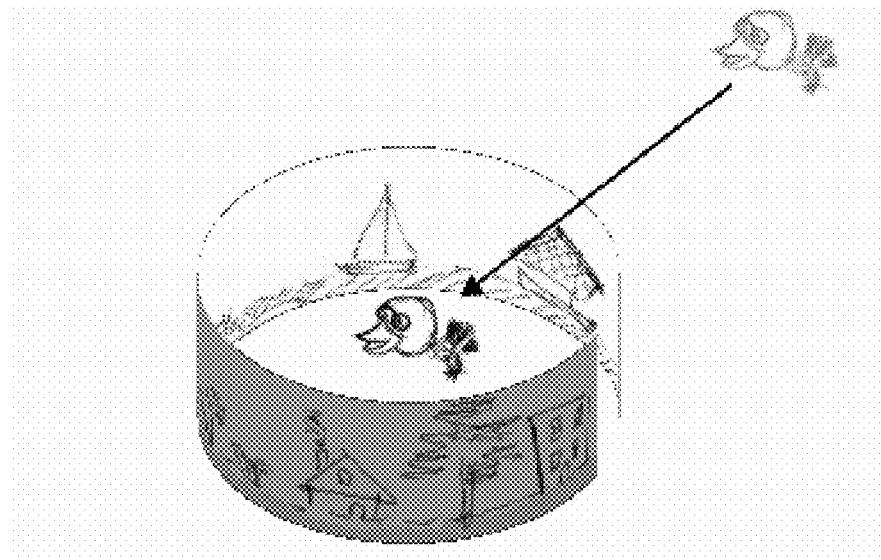
FIG. 10 illustrates the switching to view from inside.
Figure 11:
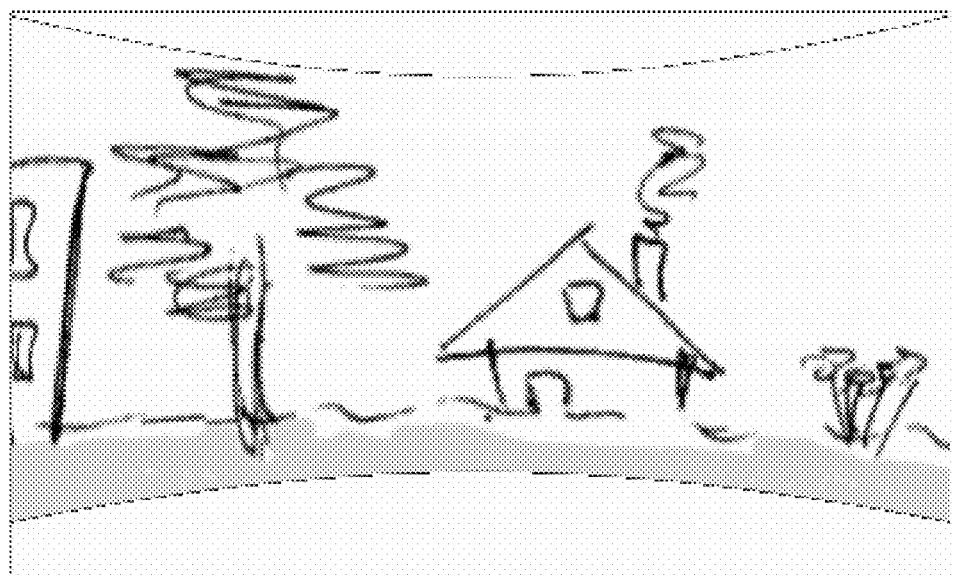
FIG. 11 shows the view from inside. With this scaling, panning is possible to left or right.
Figure 12:
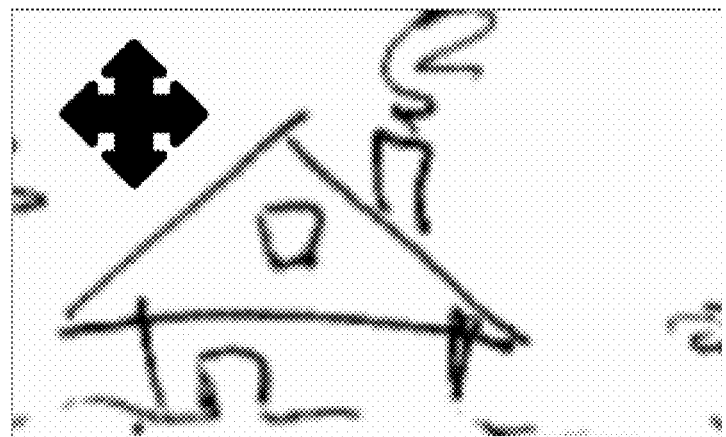
FIG. 12 is a zoom into a small portion of panorama. The arrows show the direction of possible panning.

According to the invention it is also possible to provide a more traditional, immersion view of the same cylinder from inside, from its center, as illustrated in FIGS. 10 and 11. For this view, 3 degrees of freedom are also provided. The zoom-in level defines the size of field of view, as seen in FIG. 12. The four arrows in FIG. 12 illustrate the two panning dimensions, horizontal and vertical. The horizontal offset, just as the panning angle of the bird's view, corresponds to the rotation of the cylinder.

Figure 13:
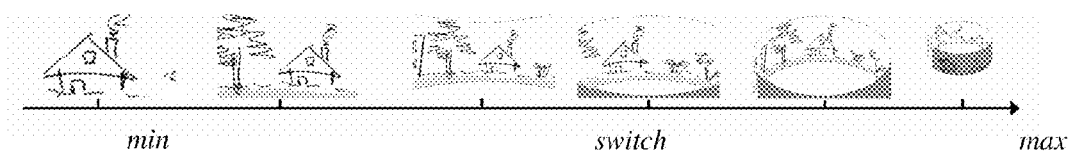
FIG. 13 illustrates the use of a "distance" coordinate.

Switching between bird's eye view and the view from inside is discontinuous, but for the end user this transition looks smooth and natural. This is achieved by defining a "distance" coordinate, as illustrated in FIG. 13. The transition preserves the panning angle, so that the part of the image in the center of the screen does not move. The field of view grows wider with distance; the sizes of objects grow smaller. The switch point is chosen so that the field of view is almost the same for bird's view and immersion view, as can be seen when comparing FIG. 8 and FIG. 11.

It should be noted that near the switch point the vertical offset and the ascent are fixed, and the user has more freedom of adjusting this third dimension as the "distance" increases or decreases.

The method of the invention is compatible with the different Man-Machine interfaces. However, in order to achieve an immersive user experience it is essential to reveal the live nature of the panorama. Panorama should display continuous movement. The best results are achieved if the tilt sensor is used to translate a gentle pitch of the device to panning command for the viewer (rotation of the cylinder). The dependence between speed of rotation and the tilt angle can be made linear for simplicity, according to one embodiment of the invention.

With a touch screen, the cylinder must correctly respond to drag. The process must differentiate between vertical motion and rotation. The vertical drag affects the ascent (for bird's view) or vertical offset, within the limits defined by current "distance". Rotation speed is adjusted so that the finger (or pointing device) remains pinned to the same object in panorama.

The touch screen interaction preferably, but not limitatively, supports flick effect: fast rotation continues after the finger is detached from the screen. In one embodiment of the invention the rotation slows down gradually, using a linear friction model. The viewer does not respond to the accelerometer while it performs the flick rotation.

In one embodiment of the invention the user interface also accepts keyboard events. By way of illustration, it may respond to left or right arrow key press with one-step rotation of the cylinder, and it may change the ascent or vertical offset one step when up or down key is pressed. The "+" and "−" keys (or volume keys on mobile devices) can be conveniently used to navigate the "distance" dimension.

An important aspect of the invention is the ability to perform the projection calculations on a mobile device in real time to allow smooth rendering of the changing scene in response to user interaction via touch screen, keyboard, and accelerometer. Therefore the invention, contrary to prior art methods, does not use a 3-dimensional perspective model of the cylinder screen (for bird's eye view). The cylinder is instead defined as a set of identical ellipse rings of 1 pixel height, and the pixel of the original panoramic image that corresponds to each pixel of the ring is found.

The whole width of the panoramic image is mapped to an arc of a circle. The radius of this circle is proportional to the "distance" dimension. For instance, for images produced by stitching planar still photos with standard 4×3 aspect ratio, the angle of the arc is determined by the following approximate formula:

$$\phi = 1.13 * a$$

where a is the aspect ratio of the panoramic image (width to height ratio), and 1.13 is a factor that accounts for camera focal length, original frame size, and cropping which is part of the stitching process.

The formulae and the geometrical model allow to perform the perspective transformation using fixed-point arithmetic, which is faster than floating point calculation by the factor of four, in one embodiment of the invention. To further reduce rendering time, the pixel data may use nearest neighbor information, but the edges of the cylinder should be anti-aliased against the background, to provide a more realistic look.

For immersive view, according to another embodiment of the invention, the reverse cylinder projection is approximated by iterative fixed-point calculation. Again, anti-aliasing can be performed on the curved edges, but typically this is not done for the pixels inside the view, although of course doing so would not exceed the scope of the invention.

As will be apparent to the skilled person, the performance of the process according to the invention can be improved by carefully optimizing a C library, referred to herein as "PxViewer". The library should be designed to provide the application with methods to render a given image in either immersive or bird's-view, according to the methods described above. The library should accept key, touch, and tilt events, to change the image rendering. Choice between immersive and bird's-view is made by the PxViewer library, and the user interface events (such as tilt and touch) are interpreted according to the current view state, zoom and position. To start working with the library, the application calls pxv_init( ) method, which returns an instance of the PxVeiwer object. The events and rendering requests are passed to this instance, and the application receives the rendered image in RGB or YUV format, ready for immediate display on the screen of mobile device.

As will be appreciated by the skilled person, different types of PxVeiwer libraries can be developed to streamline the process, which are within the scope of the routineer and are therefore not discussed herein in detail, for the sake of brevity.

The above description and examples have been provided for the purpose of illustration and the invention is not meant to be limited by them in any way. The invention encompasses all variations and alternatives, without exclusion.

The invention claimed is:

1. A method for navigating through a panoramic image in a handheld device, comprising rendering a preview of a panoramic image on a cylindrical screen (cylinder), viewed from outside, as bird's eye view, providing 3 degrees of freedom;
wherein for bird's eye view the cylinder is defined as a set of identical ellipse rings of 1 pixel height, and the pixel of the original panoramic image that corresponds to each pixel of the ring is found, thereby allowing to perform the projection calculations on a mobile device in real time to allow smooth rendering of the changing scene in response to user interaction via touch screen, keyboard, and accelerometer.

2. A method according to claim 1, wherein the 3 degrees of freedom relate to panning angle, ascent, and distance from the center of the cylinder.

3. A method according to claim 2, wherein the user is capable of adjusting the panning angle and the ascent to find better perspective.

4. A method according to claim 3, wherein the cylinder can rotate from 0° to 360° and the panning angle is not limited.

5. A method according to claim 1, wherein the user is allowed to close-up to see more detail.

6. A method according to claim 1, wherein an immersion view of the same cylinder from inside is provided, from its central axis.

7. A method according to claim 6, wherein 3 degrees of freedom are provided.

8. A method according to claim 6, wherein a smooth and natural switching between bird's eye view and the view from inside is provided by:
   a) defining a "distance" coordinate;
   b) preserving the panning angle, so that the part of the image in the center of the screen does not move, the field of view grows wider with distance and the sizes of objects grow smaller; and
   c) choosing the switch point so that the field of view is almost the same for bird's view and immersion view.

9. A method according to claim 1, wherein the whole width of the panoramic image is mapped to an arc of a circle, the radius of which is proportional to the "distance" dimension.

10. A method according to claim 9, wherein the images are assumed to be produced by stitching planar still photos with standard 4×3 aspect ratio and the angle of the arc is determined by the following approximate formula:

$$\phi = 1.13 * a$$

where a is the aspect ratio of the panoramic image (width to height ratio), and 1.13 is a factor that accounts for camera focal length, original frame size, and cropping which is part of the stitching process.

11. A method according to claim 1, wherein the reverse cylinder projection is approximated by iterative fixed-point calculation.

12. A handheld device comprising software suitable to operate the method of claim 1.

13. The handheld device of claim 12 wherein the tilt sensor is used to translate a gentle pitch of the device to panning command for the viewer (rotation of the cylinder).

14. The handheld device of claim 13, wherein the dependence between speed of rotation and the tilt angle is made linear, thereby providing an intuitive control of panning speed.

15. The handheld device of claim 12, which comprises a touch screen, wherein the cylinder's rotation speed is adjusted so that the finger (or pointing device) remains pinned to the same object in panorama.

16. The device of claim 12, wherein the touch screen interaction supports flick effect and fast rotation continues after the finger is detached from the screen.

17. The device of claim 16, wherein the rotation slows down gradually, using a linear friction model 18. The device of claim 12, wherein the user interface also accepts keyboard events.

19. The device of claim 12, which is a cellular phone.

20. The device of claim 12, which is a digital camera.

21. A method for navigating through a panoramic image in a handheld device, comprising rendering a preview of a panoramic image on a cylindrical screen (cylinder), viewed from outside, as bird's eye view, providing 3 degrees of freedom;
   wherein the whole width of the panoramic image is mapped to an arc of a circle, the radius of which is proportional to the "distance" dimension;
   wherein the images are assumed to be produced by stitching planar still photos with standard 4×3 aspect ratio and the angle of the arc is determined by the following approximate formula:

$$\phi = 1.13 * a$$

where a is the aspect ratio of the panoramic image (width to height ratio), and 1.13 is a factor that accounts for camera focal length, original frame size, and cropping which is part of the stitching process.

* * * * *